Nov. 20, 1951 K. M. FRITTS 2,575,588
COMBINED REEL FOR A FISHING POLE AND LOCKING MEANS THEREFOR
Filed May 15, 1948

INVENTOR.
KENNETH M. FRITTS
BY
Florian G. Miller
Atty.

Patented Nov. 20, 1951

2,575,588

UNITED STATES PATENT OFFICE 2,575,588

COMBINED REEL FOR A FISHING POLE AND LOCKING MEANS THEREFOR

Kenneth M. Fritts, Erie, Pa.

Application May 15, 1948, Serial No. 27,166

1 Claim. (Cl. 242—84.5)

This invention relates generally to fishing reels and locks therefor and it relates more particularly to a novel combined reel and simple locking means therefor for use in conjunction with a fishing pole.

It is an object of my invention to provide a combined reel and locking means therefor which is simple in construction, economical in cost, economical in manufacture and efficient in operation.

Another object of my invention is to provide a very simple and efficient combined reel and locking means therefor which may be attached to any fishing pole with a minimum of cost and with a minimum of effort and which permits the pole to lie flat in storage.

Another object of my invention is to provide a locking device for a reel which may be flipped into position by the finger of the hand holding the pole to lock the reel against rotation in a clockwise or a counterclockwise direction as desired.

Figure 1:
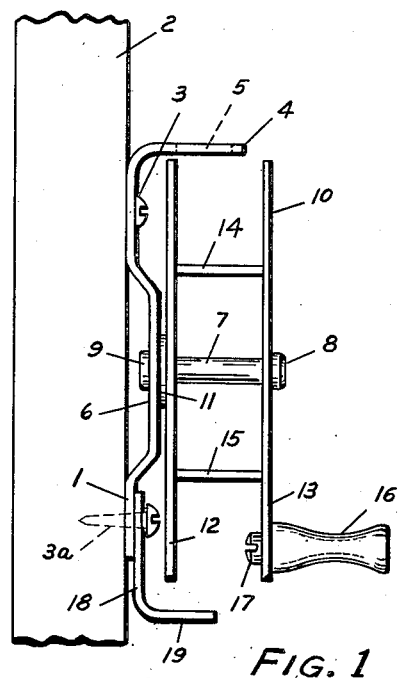
Figure 2:
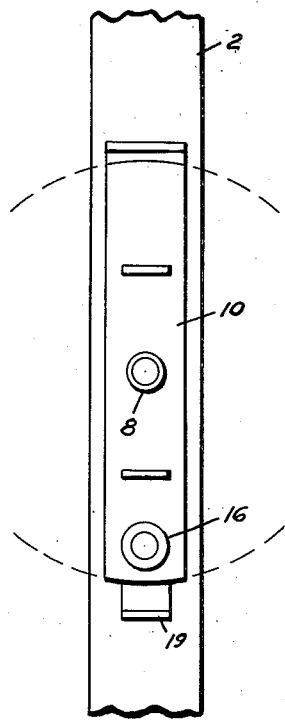
Figure 3:
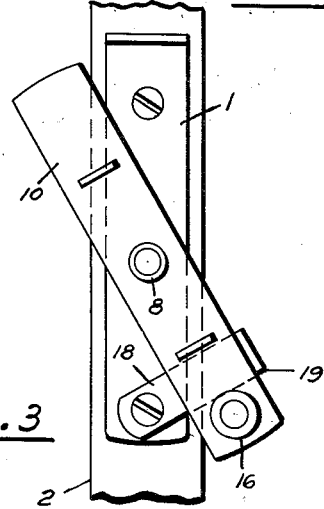

Other objects of my invention will become evident from the following detailed description, taken in conjunction with the accompanying drawings, in which Fig. 1 is a plan view of my novel reel and locking means therefor attached to the side of a fishing pole;

Fig. 2 is a side elevational view of the combined reel and locking means therefor shown in Fig. 1; and Fig. 3 is a side elevational view of my novel reel and locking means therefor showing the reel locked against rotation in a counterclockwise direction.

Referring now to the drawings, Figs. 1, 2 and 3 show a bracket 1 attached to a fishing pole 2 by wood screws 3 and 3a. The end 4 of the bracket 1 is flanged outwardly at right angles and it is provided with an aperture 5 for guiding a fishing line (not shown). The intermediate portion 6 of the bracket 1 is struck outwardly a predetermined amount and it is apertured centrally thereof to receive and support a pivot pin 7. The pivot pin 7 has an enlarged head 8 and the end 9 thereof is peened over so as to hold the pin in the apertured struck-out portion 6 of the bracket 1. A box shaped reel member 10 is pivoted on the pivot pin 7 centrally thereof. A spacing washer 11 is disposed between the box-like member 10 and the struck-out portion 6 of the bracket 1. The box-like member 10 comprises comparatively long, parallel plates 11 and 12 connected together by transverse members 13 and 14. The transverse members 13 and 14 are spaced from the outer ends of the plates 11 and 12 to form U-shaped opposing ends for reeling a fishing line thereon. A handle 16 is secured to one end of the plate 12 by a screw member 17. An L-shaped pivoted locking member 18 is pivoted on screw member 3a. The locking member 18 may be rotated in either direction whereby the outwardly extending portion 19 thereof is disposed in the path of rotational movement of the box-like reel member 10 to hold it against rotation as shown particularly in Fig. 3. Normally, the locking member 18 is disposed a distance from the end of the fishing pole 2 so that a person gripping the fishing pole on the end thereof my rotate the locking member 18 in either direction by use of the index finger.

In operation, a line is wound on the reel member 10. After the line is reeled on the box-like reel member 10, the line is passed outwardly through the guiding aperture 5 in the bracket 1 and the necessary hooks, etc. are placed on the end of the line. For casting, the locking member 18 is moved to a position shown in Fig. 1 and the line is thrown outwardly. At any predetermined time, the locking member 18 is flipped downwardly to a position as shown in Fig. 3 or to an opposite position by the index finger to prevent any further reeling out of the line. The reel 10 may then be rotated after the locking member 19 is again moved to a neutral position by rotating the handle 16.

It will be evident from the foregoing description that I have provided a very simple reel for a fishing pole and novel locking means therefor which is very simple in construction and operation, extremely easy to operate with a finger of the hand grasping the fishing pole, and one which is comparatively small and which aligns with the length of the pole along the side thereof to minimize bulkiness and permit the pole to lie flat in storage.

I wish it to be understood that I do not desire to be limited to the exact details of construction shown and described in this specification as illustrative of a preferred form of my invention, for obvious modifications will occur to a person skilled in the art.

What I claim is:

A combined reel and locking means therefor for a fishing pole comprising a bracket adapted to be attached to the side of a fishing pole, screw members for securing said bracket to the side of a fishing pole, a comparatively long box shaped reel member having open opposite ends thereon for reeling a line, a pivot pin attached to said bracket and extending through the center of said box shaped reel member, and an L-shaped pivoted locking member pivoted on one of said screw members securing said bracket to said fishing pole adapted to be disposed in the path of said box shaped reel member upon rotation thereof in a clockwise or a counterclockwise direction.

KENNETH M. FRITTS.

REFERENCES CITED

The following references are of record in the file of this patent:

UNITED STATES PATENTS

| Number | Name | Date |
|---|---|---|
| 664,786 | Setchell et al. | Dec. 25, 1900 |
| 1,827,488 | Roach | Oct. 13, 1931 |
| 2,249,433 | Palmer | July 15, 1941 |
| 2,442,670 | Tarasuk | June 1, 1948 |